Feb. 14, 1961  H. F. GEOFFROY  2,971,633
CONVEYOR
Filed Feb. 6, 1959  3 Sheets-Sheet 1

INVENTOR
HENRI FERNAND GEOFFROY
BY *Linton and Linton*
ATTORNEYS

Feb. 14, 1961 H. F. GEOFFROY 2,971,633
CONVEYOR
Filed Feb. 6, 1959 3 Sheets-Sheet 2
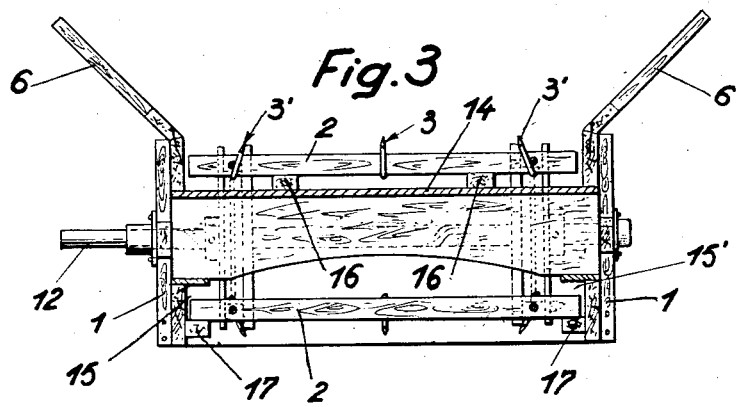
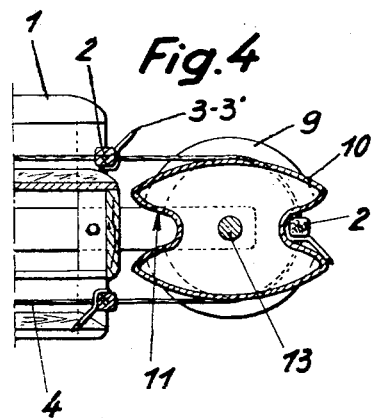
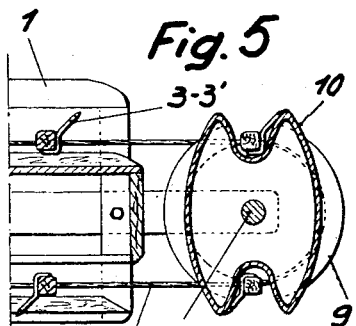
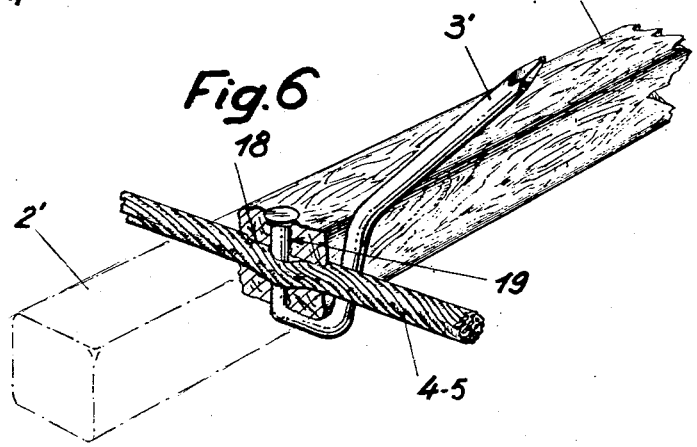
INVENTOR
HENRI FERNAND GEOFFROY
By Linton and Linton
ATTORNEYS

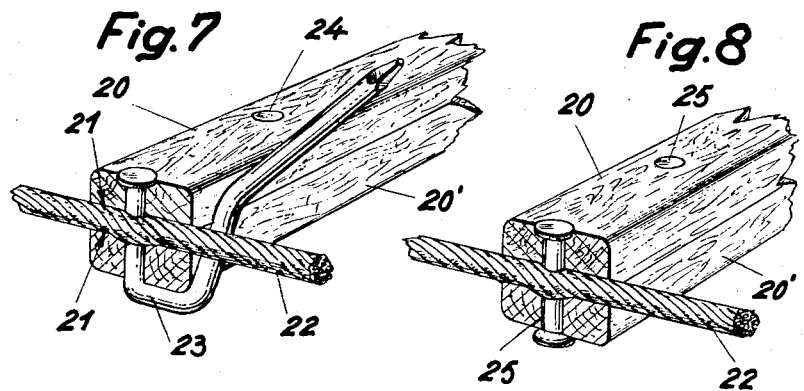
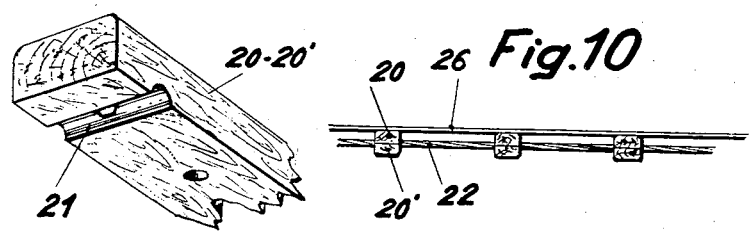
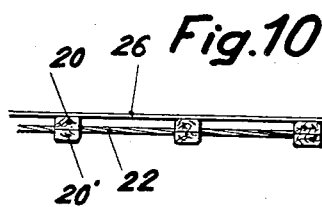
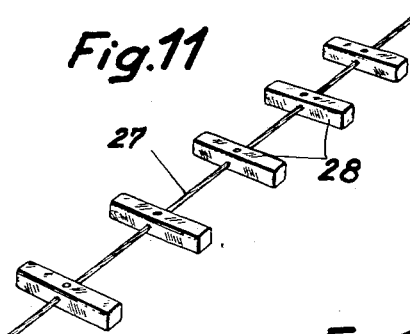
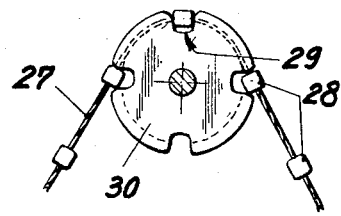
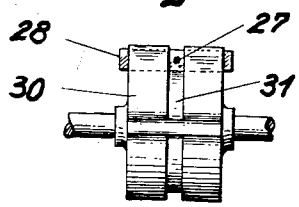

United States Patent Office 2,971,633
Patented Feb. 14, 1961

2,971,633

CONVEYOR

Henri Fernand Geoffroy, Fragny-par-Gacogne, Nievre, France

Filed Feb. 6, 1959, Ser. No. 791,620

Claims priority, application France Feb. 21, 1958

4 Claims. (Cl. 198—178)

This invention relates to transporters or conveyors, for the elevation of crops or for industrial uses, and also to endless transmission or driving means.

The invention provides a transporter or conveyor which is very light in weight, cheap to construct, flexible in operation without any risk of slipping of the conveyor proper, and not unduly noisy in action.

A transporter or conveyor in accordance with the invention comprises battens arranged in parallel at regular intervals across and fixed to two laterally spaced endless ropes or cables extending parallel to each other. The battens may or may not be furnished with points or spikes.

A feature of the invention is that the cables at the receiving end of the apparatus pass about driving pulleys in the form of sprocket wheels each with two notches in which the battens engage, and, at the discharge end, they pass about a freely rotatable drum similarly having sprocket wheels but the central part whereof between said wheels is of oval cross-section so as to act as an ejector and depress the points or spikes if these are fitted to the battens.

The invention also extends to divers improvements, aiming at facilitating any necessary replacement of a batten whether worn or broken; and to the use of the transporting mechanism as a conveyor for all sorts of agricultural uses or industrial purposes, in combination or otherwise, with pockets, raised battens, or a rubber belt or apron or the like covering the same.

Further the principle of attaching battens to ropes, or even to a single rope, enables transmission belts of great length and slow speed to be constructed; for instance, for installations in which the use of metal chains or of ordinary belting is not possible, such as flour mills, chemical plants, underwater transmissions and so forth.

The invention will be better understood from the following description of exemplary embodiments that are illustrated on the accompanying drawings whereon:

Fig. 3 is a cross-section, on a larger scale, in the plane a—a of Fig. 1;

Figs. 4 and 5 are two enlarged views, partly in section, showing the action of the ejector mechanism;

Fig. 6 is a perspective view showing one mode of attaching a batten to a wire rope;

Figs. 7 and 8 are two partially perspective views showing other modes of attachment of the battens that enable their easy replacement;

Fig. 9 represents separately and in perspective a part of one of the two elements constituting a batten in Figs. 7 and 8;

Fig. 10 shows such a transporter covered with a continous apron;

Fig. 11 is a perspective view of a batten arrangement forming a power-transmission belt;

Fig. 12 shows the arrangement of Fig. 11 running over a pulley in the form of a sprocket; and Fig. 13 is a side view corresponding to Fig. 12, only one batten and the corresponding rope being represented.

Figure 1:
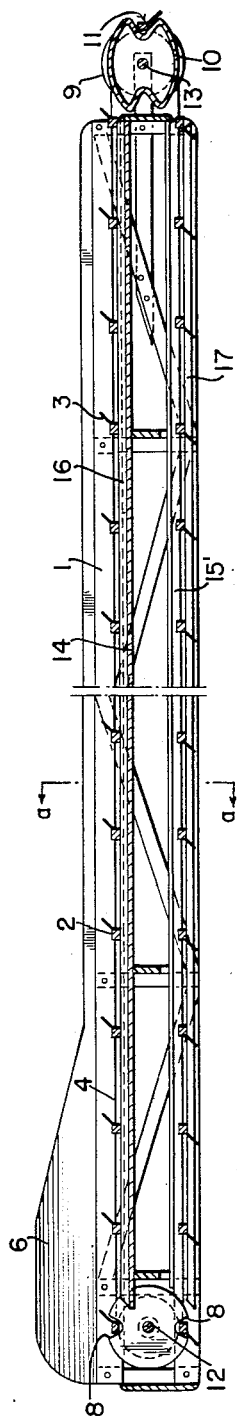
Fig. 1 is a sectional elevation of one form of transporter-elevator in accordance with the invention.
Figure 2:
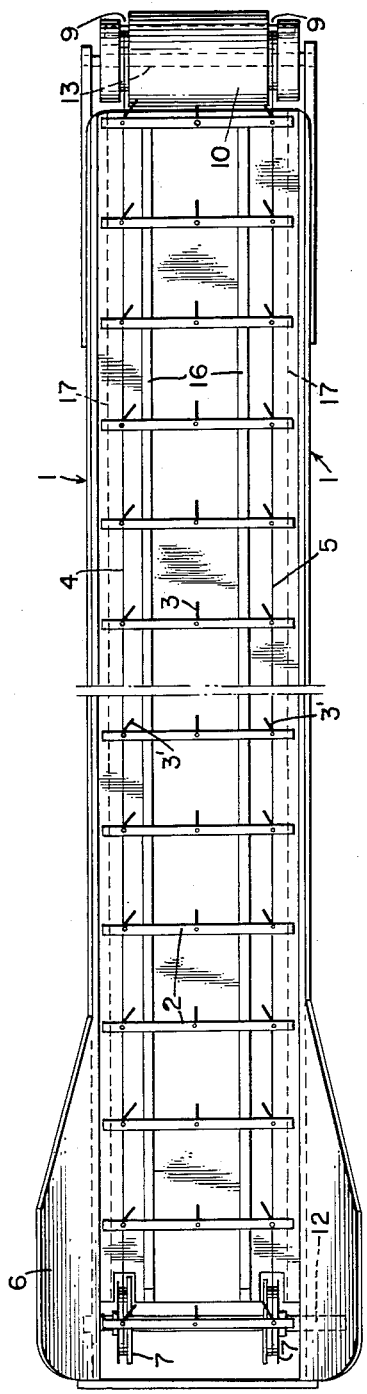
Fig. 2 is a plan corresponding to Fig. 1.

With reference first more particularly to Figs. 1 to 5, the transporter-elevator there illustrated comprises a wooden frame 1 between the two longitudinally extending sides whereof wooden battens 2 are arranged transversely and at regular intervals, being attached to two endless side ropes 4, 5 of wire and equipped with points or spikes 3.

The receiving end of the transporter is formed with a hopper 6, and the ropes 4, 5 at this end pass about two driving pulleys 7 each having diametrally-opposed notches 8; at the other end of the transporter the ropes pass about two pulleys 9 having notches similar to those in the pulleys 7 and forming the ends of a freely rotatable drum 10 the central part whereof is of oval cross-section in order to act as an ejector. For this purpose the central part of the drum 10 also has two longitudinal grooves corresponding to the notches in the pulleys 9, into which the battens 2 enter and the spikes 3 are retracted (Figs. 4 and 5).

It will be easily understood that the battens 2 attached on the ropes 4, 5 act with reference to the pulleys 7 and 9 in the manner of a chain whereby slipping is positively prevented. The pulleys 7 are keyed on a rotatably mounted shaft 12 connected with external driving means (not shown) while the pulleys 9 and the drum 10 rotate freely on a fixed shaft 13.

The frame 1 is equipped internally with a table 14, and two troughs 15 and 15' are also provided (Fig. 3). The battens 2 in the upper run bear on skids 16 on the table 14 and in the lower run (return direction) they pass along said troughs and bear on skids 17 attached to the sides of the frame.

The mode of attaching each batten 2 to the ropes shown in Fig. 6 is as follows: Each end portion 2' of each batten 2 has two holes 18 and 19 intersecting one another at right angles and into which are respectively inserted the cable 4 or 5 and a pin 3'. This pin passes through the cable and is bent twice at right angles against the batten so as to extend in front thereof as shown.

The variant mode of batten attachment shown in Fig. 7 enables rapid replacement of a broken batten. Each batten is made in two identical parts 20 and 20' each having transverse, semicircular grooves 21 that enable the rope or cable, here designated 22, to be gripped therein by means of a pin 23 passing through it. The two parts 20 and 20' are attached to one another by rivets 24 or by bolts and nuts.

Fig. 8 shows a further variant in which the pins 23 are omitted and the parts of each batten are secured together as by rivets 25 some of which pass through the rope or cable 22.

The battens can be made of a plastic material, instead of wood, or can be sheathed in a plastic material together with the ropes or cables; the resulting conveyor may incorporate buckets or raised cross-bars; and the battens may be made to carry a belt or apron 26 of rubber or other material (Fig. 10). The raised cross-bars may each consist of a detachable element bolted to the original batten and have at the rear one or two struts resting against the next following batten. Such raised elements can also be periodically exchanged on the battens, to prevent fatigue and premature wear of the ropes or cables.

In all cases, the battens are driven direct by engaging in the notches of the pulleys.

It is possible, by applying this principle of battens fixed on ropes or cables, to obtain an arrangement capable of acting as a transmission driving belt or chain (Figs. 11, 13). In this case, intended particularly for transmissions of considerable length running at low speeds, a single rope or cable 27 will suffice, carrying short battens 28 spaced at regular intervals. Such battens engage in the notches 29 of a pulley 30, which may be either a driver or a follower, having a central groove 31 into which the said rope or cable enters. Such a transmission element can, of course, incorporate a number of cables, according to the power to be transmitted. If the ropes or cable are made of non-rusting material or are sheathed with plastic material, such a transmission line can be made to work under water or even in an acid medium. It is silent-running and cheap to make.

The present invention is obviously not restricted to the embodiments described and illustrated since constructional modifications may be made as will now be readily apparent.

I claim:

1. A conveyor comprising an elongated frame, two pairs of pulleys with each pair being rotatably mounted at an opposite end of said frame, a pair of endless cables extending parallel to one another within said frame and each passing around a pulley of said two pairs of pulleys, a plurality of battens extending across said cables at spaced intervals and parallel to one another, said pulleys having peripheral grooves positioned for receiving one of said battens at a time therein as said cable passes around said pulleys, a plurality of pins each extending through one of said battens and the portion of the cable adjacent thereto retaining said battens in their spaced positions on said cables, a drum rotatably mounted at one end of said frame between the pulleys at said frame end and said drum having an oval cross-sectional configuration with peripheral indentations for receiving said battens therein and forming an ejector for material carried by said battens.

2. A conveyor as claimed in claim 1 wherein said battens each have a pair of openings therethrough with one of said cables extending through one of said openings, each batten further having a second pair of openings each extending laterally of and through one of said first mentioned openings, said pins each extending through one of said second mentioned openings and the portion of the cable in the corresponding first mentioned opening, said pins each having a portion exteriorly of its batten of a configuration for preventing the moving of the pin from its batten.

3. A conveyor as claimed in claim 1 wherein each batten has openings with said cables passing therethrough, said pins extend through the portions of the cables within said battens, each pin has a flattened head exteriorly of its batten and a bent end portion extending along the bottom of its batten and then upwardly above its batten providing spikes for engaging and moving material to one side thereof.

4. A conveyor as claimed in claim 1 wherein a table extends longitudinally of said frame beneath said battens, a plurality of skid members are mounted on said table and have an upper run of said battens slideably positioned thereon and further skid members connected to said frame below said table slideably supporting a lower run of said battens.

References Cited in the file of this patent

UNITED STATES PATENTS

| | | |
|---|---|---|
| 527,722 | Sargent et al. | Oct. 16, 1894 |
| 597,096 | Beckwith | Jan. 11, 1898 |
| 675,703 | Allen | June 4, 1901 |
| 2,062,115 | Bendall | Nov. 24, 1936 |
| 2,097,534 | Rossman | Nov. 2, 1937 |
| 2,582,057 | Mueller | Jan. 8, 1952 |